May 13, 1941.   H. H. HARRIS   2,241,399
CONVEYING MEANS
Filed Aug. 10, 1938   3 Sheets-Sheet 1

INVENTOR
Henry H. Harris
BY
Dyke and Schaines
ATTORNEYS

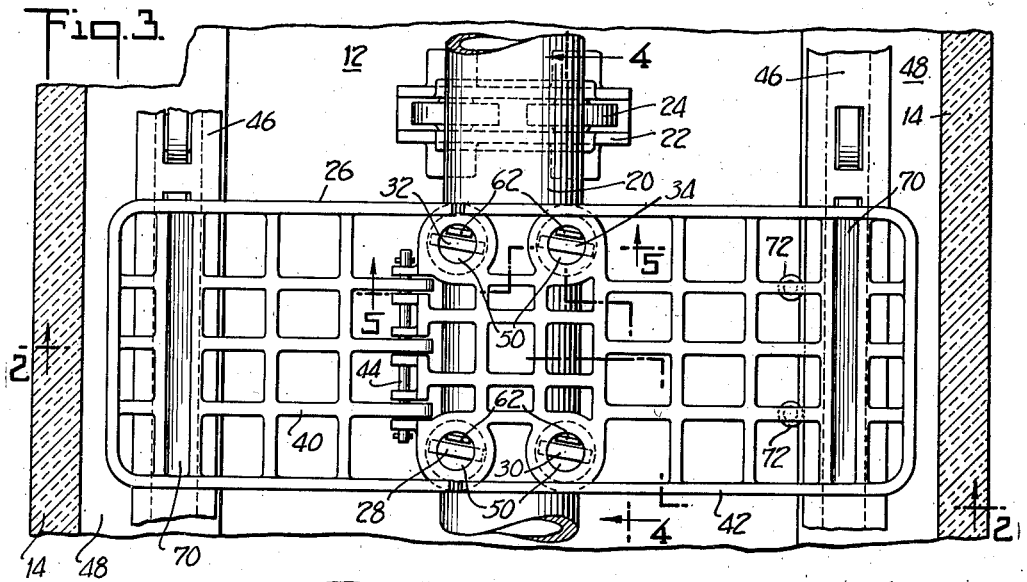
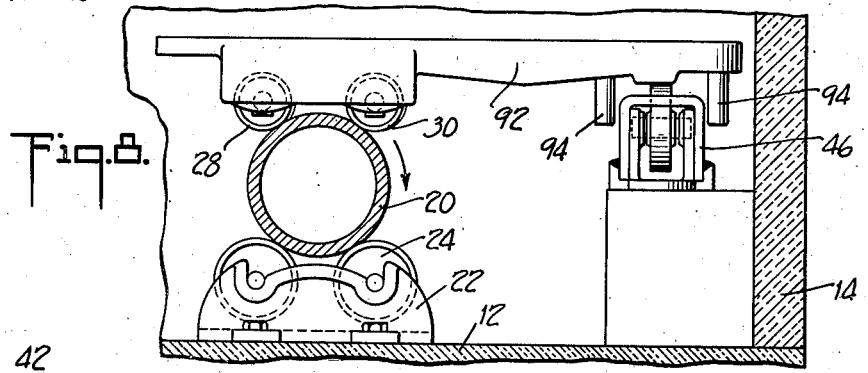
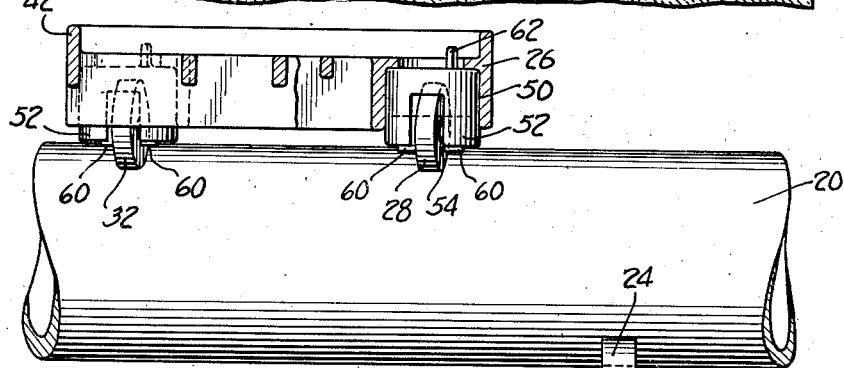

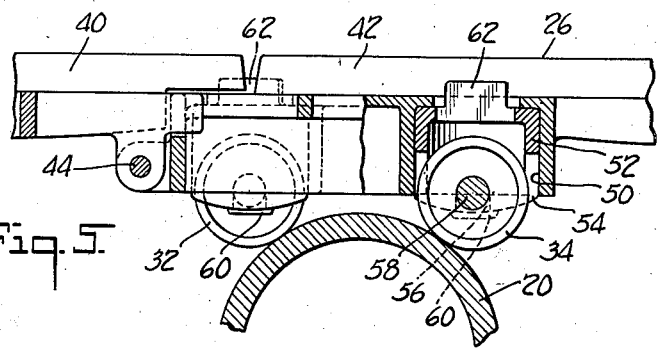
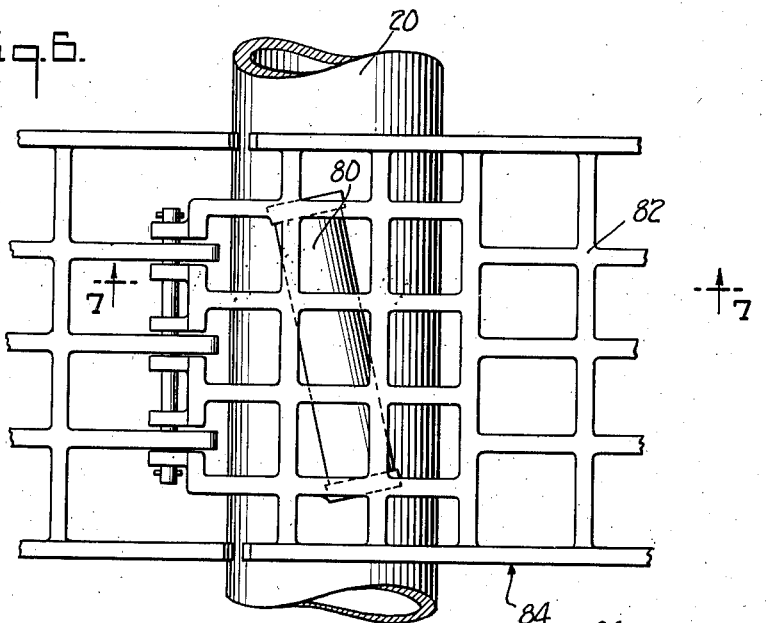
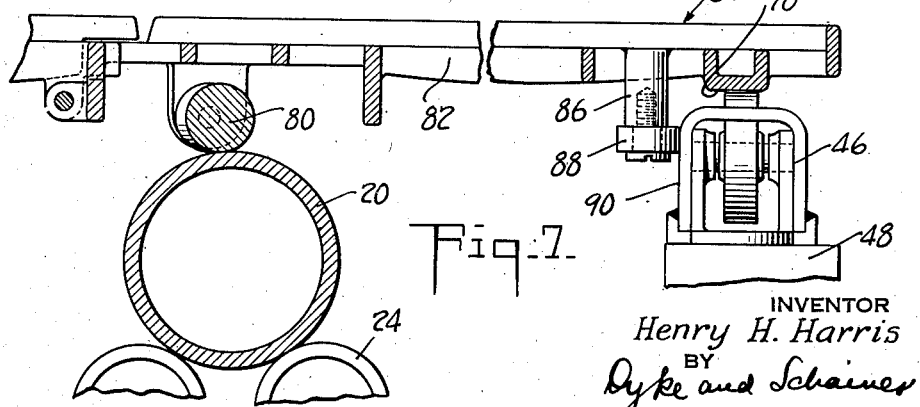

Patented May 13, 1941

2,241,399

UNITED STATES PATENT OFFICE 2,241,399

CONVEYING MEANS

Henry H. Harris, Champaign, Ill.

Application August 10, 1938, Serial No. 224,020

2 Claims. (Cl. 198—127)

My invention relates to an apparatus for conveying load supports and their loads. While, as will be apparent from the following description, my invention is broadly applicable to other and varied industrial uses, I have illustrated and described same in connection with its application to the conveying of work supports such as trays, and the like, with their load of posts or pieces to be heat-treated through furnaces used for the heat treatment of metals, etc.

The main object of my invention is the provision of an apparatus to translate rotary movement of one member into linear movement of a second member in a direction at right angles to the direction of rotation of the first member, without the use of screw threads or equivalent.

Another object of my invention is the provision of an apparatus whereby rotary movement of a smooth-surfaced cylindrical member is utilized to convey articles lengthwise of such cylindrical member.

Along with the aforesaid objects, it is a further object of the present invention to provide a support on which articles are disposed and a cylindrical member bearing against the underside of the said support, and to so relate the support and member that by rotating the member the support will be moved in a direction transverse of the direction of rotation of the conveyor.

Broadly, these are the main objects of my invention. Specifically, and with respect to its application to a heat-treating furnace, it is an object of my invention to provide an apparatus adapted to convey one or more load supports, such as loaded trays, or the like, individually through a furnace at one time without use of chains, screws or pushers pushing the trays in tandem.

One of the main objections to the conventional pusher furnace in which an entire line of trays must be set up and moved in tandem in order to pass any one tray through the furnace, is the cost of operation and maintenance. The wasteful character of this procedure is obvious, and particularly so when it is considered that an entire line of trays must be assembled in order to convey any thereof through the furnace. It is equally obvious that an apparatus whereby one or more trays can be conveyed individually must inevitably result in great economies of operation and maintenance. Conveying the trays separately and individually also eliminates all compression strains which are necessarily and destructively set up when a line of abutting trays is pushed through a furnace in tandem.

A further object of my invention is the provision of a cylindrical tube within a furnace and disposed longitudinally or lengthwise of the furnace, and so arranged that its rotation will impart forward movement to trays superposed thereon.

A further object of my invention is the provision within a heat-treating furnace of a rotatable tube disposed longitudinally of the furnace, and a load-supporting member carried thereby, with the tube and member so related that rotation of the cylindrical tube results in movement of the member and its load through the furnace.

Still another object of my invention is the provision of a tray which has rollers or casters mounted on the underside thereof for coaction with a rotating cylindrical tube to produce movement of the tray in a direction parallel to the tube axis.

Still another object of my invention is the provision of a tray which has rollers or casters mounted on the underside thereof, which casters are adapted to be angularly held against a rotating member to cause movement of the tray through a heat-treating furnace.

Still another object of my invention is to provide a tray with rollers on the bottom thereof, at one side of the tray, for coaction with a rotating cylindrical tube and cause the tray to be moved in the lengthwise direction of the tube.

Still another object of my invention is to provide a tray made up of a plurality of hinged sections, having rollers on the underside thereof, in the center of the tray, to straddle a rotating cylindrical tube, whereby the tray is moved lengthwise of the tube, upon rotation thereof.

In the drawings annexed hereto and made a part hereof,

Fig. 3 is a top plan view of the conveying apparatus and load-supporting member;

Fig. 4 is a section along the broken line 4—4 of Fig. 3;

Fig. 5 is a section along the broken line 5—5 of Fig. 3;

Fig. 6 is a view, similar to Fig. 3, of a modified form of load-supporting member also constructed according to and embodying the principle of my invention.

Fig. 7 is a section on the line 7—7 of Fig. 6; and

Fig. 8 is a view similar to Fig. 2 of another modification, also constructed according to and embodying my invention.

Figure 1:
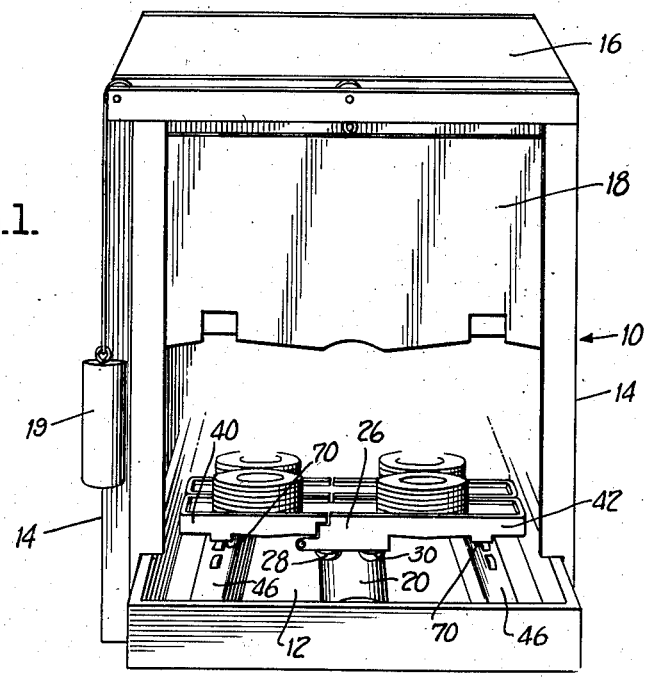
Figure 1 is a perspective view of a heat-treating furnace within which one form of conveying means constructed according to and embodying my invention is installed.
Figure 2:
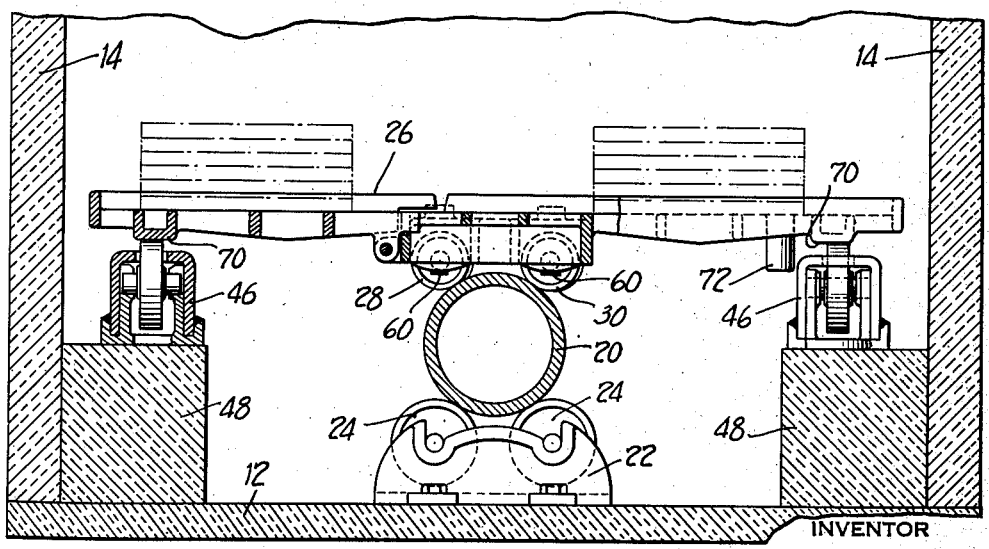
Fig. 2 is an enlarged transverse sectional view through a portion of the furnace of Fig. 1 on the broken line 2—2 of Fig. 3, and showing the conveying means partly in elevation and partly in section.

The heat-treating furnace in respect of which I am describing my invention is preferably one in which a carbonaceous atmosphere is circulated during passage of the work to be treated therethrough, with provision to keep the furnace sealed during the process. Reference numeral 10 indicates generally this type of furnace, which has a bed or floor 12 (see Fig. 2), side walls 14, 14, roof 16, and door 18. Door 18 is preferably provided with counterweights 19 whereby the door 18 may be readily opened to permit entry of load supports into the furnace.

For moving the work supports and load through the furnace I provide a smooth-surfaced cylindrical roll 20. Roll 20 is preferably hollow for lightness and strength but may be solid if desired. Except in the modification of Fig. 8, roll 20 as shown is disposed centrally of the furnace floor or bed 12, parallel to walls 14, 14, and extends longitudinally of the furnace from front to back thereof. Means are provided on the furnace floor or bed 12 to support the weight of the tube 20 and the load therein. For this purpose, spaced-apart blocks 22 are provided, with rollers 24 journaled therein, and so spaced apart on the block 22 that they are adapted to receive roll 20 between them, while permitting roll 20 to rotate freely. By using blocks for roller-bearing support of the roll, the blocks 22 can be permanently secured to the floor after the roll 20 is in place, thus getting accurate alignment of the roll 20 on the furnace floor. The roller-bearing supports for the roll 20 can be arranged to distribute the combined weight of the roll and load therebetween, and to support the roll against buckling and bending. The axes of rollers 24 are parallel to that of roll 20, and there is no other than rotary movement therebetween, the roll 20 merely turning freely on rollers 24. Roll 20 may be rotated from any convenient source of power (not shown).

In the embodiment of my invention illustrated in Figs. 1 to 5, I provide the supported member, as the work support or tray 26, with a number of small smooth-surfaced rollers or wheels on the underside thereof and adapted to support at least a large part of the weight of supports 26 and their load by riding on roll 20. I preferably provide two pairs of rollers or wheels, or four in all; two, 28, 30 at the front of the tray and two more, 32, 34 at the rear of the tray. The rollers or wheels of each pair, 28, 30 and 32, 34 are spaced apart, see Fig. 2, so that they straddle the top of roll 20 therebetween. These rollers or wheels are journaled to tray 26 with their axes in parallelism to one another, but at an angle or bias with respect to the axis of roll 20. In operation, rotation of roll 20 will cause the heavily loaded rollers or wheels 28—34 to rotate and cause the tray 26 to move forward or backward along the roll 20 at a rate depending on the particular angle or bias given to the wheels or rollers with respect to the roll 20, and whether the roll 20 is rotated in a clockwise or counter-clockwise direction.

The preferred form of tray 26 is shown best in Figs. 3 and 5, and it comprises a pair of cast, or otherwise formed, sections 40, 42 of skeleton formation, pivotally secured together by a pin 44. The sections are of unequal size, the larger section 42 having the caster rollers or wheels 28—34 secured therewithin, and the smaller section 40 being hinged thereto, at one side of roll 20.

Tray section 42 is shown as being formed with four circular sockets 50, at its end adjacent to section 40, into each of which sockets 50 is fitted a caster wheel bearing piece 52. Each bearing piece 52 is provided with a slot 54 and a pair of transversely arranged bearing slots 56 into which are fitted the journals 58 of wheels or rollers 28—34. A pair of lock strips 60 are welded across the open ends of the bearing slots 56 to keep the rollers or wheels within the bearing pieces 52. A lug 62 is provided at the top of each bearing piece 52 and when it is desired to weld the bearings 52 to the tray section 26, the weld may be made against lug 62 which is readily accessible. Lugs 62 also serve as guides for the above-described angulation of rollers or wheels 28—34.

In the forms shown in Figs. 1–7, the tray 26 is adapted to be supported from beneath at three points or regions, one in the center and the others at each side thereof. The support at the center is provided by the roll 20, while the support at the sides is provided by anti-friction devices such as roller rails 46, the specific construction of which forms the subject-matter of my copending application, Serial No. 191,867. To keep the tray level, I preferably provide a pair of platforms 48, 48 built along the side walls 14 of furnace 10, see Fig. 2, and locate the roller rails 46 thereon.

Tray section 42 is supported from beneath by one roller rail 46 and by the roll 20. Section 40 is supported partly by the other roller rail 46 and partly from the inner end of section 4. Both tray sections 40 and 42 are provided with flattened skid portions 70 on the underside thereof to ride on the rollers in the roller rails 46.

When tray 26 is loaded, the weight of the tray and its load will be largely supported through rollers 28—34 bearing upon roll 20. Rotation of tube 20 causes opposite rotation of rollers 28—34. The angular disposition of rollers 28—34 causes advancing movement of the loaded tray along the roller. The weight of the tray and the load resting on the roll 20, and the straddling of roll 20 by rollers 28—34 will absorb any sidewise thrust of the tray and so keep the tray in position over the supports. A number of depending guide lugs 72 are formed on the underside of tray section 42 to assist in keeping the section from shifting off the roller rails.

The rate of linear movement of the tray through the furnace is a function of the speed of tube rotation and of the angularity of the rollers or casters 28—34 with respect to the axis of roll 20. Both speed and angularity may be varied to regulate the rate of tray movement, as desired.

In the modified form of my invention illustrated in Figs. 6 and 7, roll 20, roller bearing support 22, side roller rails 46, etc., are all identical with similar parts described in relation to Figs. 1–5. However, in this modification, instead of two pairs of tube-straddling rollers or casters on the underside of the tray, I provide a single elongated roller 80, which is so secured to the underside of the main section 82 of the tray 84 as to bear upon roll 20. Roller 80 is of substantial length and its axis is biased, or angled, with respect to the axis of roll 20 similarly to rollers or wheels 28—34. To insure tray 84 against sidewise movement in response to sidewise thrust developed by rotation of tube 20, guide lugs 86 are provided on the underside of tray section 82, having rollers 88 thereon bearing against the inner side wall 90 of roller rails 46. Except for the elongated roller support 80, and its attachment to the tray and the roller guide lugs 86, the tray of this modification is substantially similar to the two-section tray of the modification of Figs. 1–5.

In the further modification of my invention illustrated in Fig. 8, I employ but one tray section 92, which may be similar to tray section 42 of the embodiment illustrated in Figs. 1–5. In this form, however, the tray is in one piece without the hinge. With such one-piece tray I dispense with one of the side supports, as the roller rails 46, and support the tray at one end by roll 20 and at the other end by a single roller rail 46. In this arrangement roll 20 may, if desired, be located along one side of the furnace instead of down the center. With this arrangement, guide lugs 94, 94 are provided which extend downwardly over both sides of the single roller rail 46 that supports one side of the tray. In this form the traveling movement is delivered at one side of the tray, but the straddling of the roll 20 by the four caster rollers 28—34 will be sufficient to prevent binding and insure smooth movement of tray 92 along the desired path within the furnace.

Still other modifications may be resorted to without departing from the scope of my invention. The various modifications which I have described and illustrated are not to be construed as limitations, the scope of my invention being defined by the annexed claims.

With my invention it is possible to move loaded trays at any desired speed. The speed of tray movement through the furnace may be varied simply and easily. Roll 20 may be slightly inclined downwardly from the entrance end of the furnace in case only one-way travel of the trays or wagons borne thereby is wanted. My mechanism can handle one or more trays at a time, and is economical in operation and maintenance. The smooth-surfaced cylindrical roll or tube and the tray rollers require very little or no servicing; there are very few parts to get out of order, and in operation my invention has proven to be of the utmost practicality.

Having described my invention, what I claim and desire to secure by Letters Patent is:

1. In combination, a tray and means to support and convey same through a heat treating furnace, the supporting means comprising a pair of aligned and spaced apart trackway members disposed on opposite sides of and extending the length of the furnace and a central smooth-surfaced cylindrical roll also disposed within the furnace and extending the length thereof substantially midway between the trackways, the tray comprising a plurality of sections hinged together and having rotary members on the underside thereof bearing against the upper portion of the roll, the axes of said rotary members being biased with respect to the axis of the roll, whereby rotary movement of the roll moves the tray through the furnace lengthwise of the roll.

2. In combination a tray and means to support and convey same through a heat treating furnace, the supporting means comprising a pair of aligned and spaced apart trackway members disposed on opposite sides of and extending the length of the furnace and a central smooth-surfaced cylindrical roll also disposed within the furnace and extending the length thereof substantially midway between the trackways, the tray comprising a plurality of sections hinged together and having a plurality of rotary members on the underside of the tray, bearing against the upper portion of the roll and arranged in pairs and spaced apart to straddle the roll, the axes of which rotary members are all parallel to each other, but inclined or biased with respect to the axis of the roll, whereby rotary movement of the roll causes linear movement of the tray along the axis of the roll.

HENRY H. HARRIS.